United States Patent Office 3,059,950
Patented Oct. 23, 1962

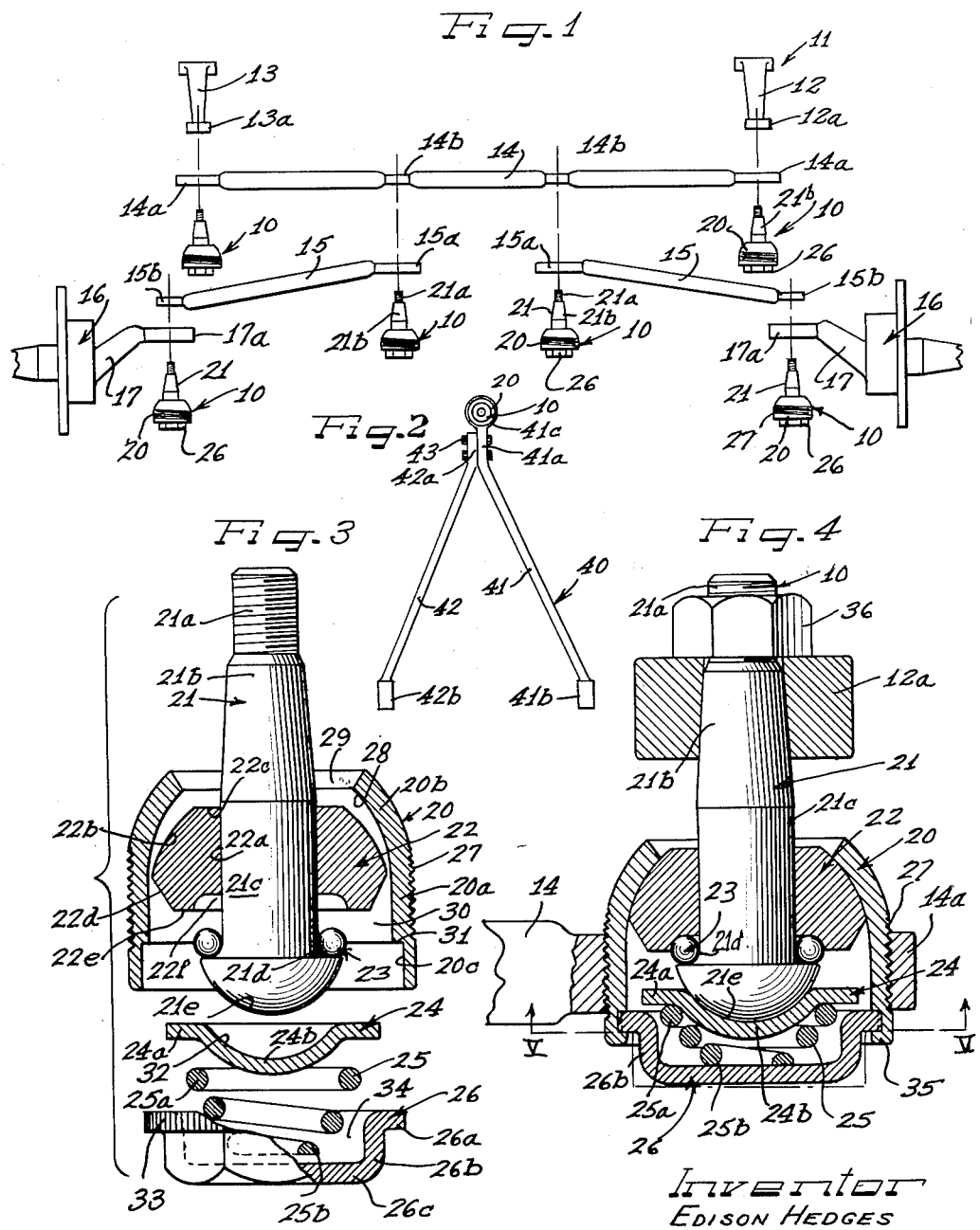

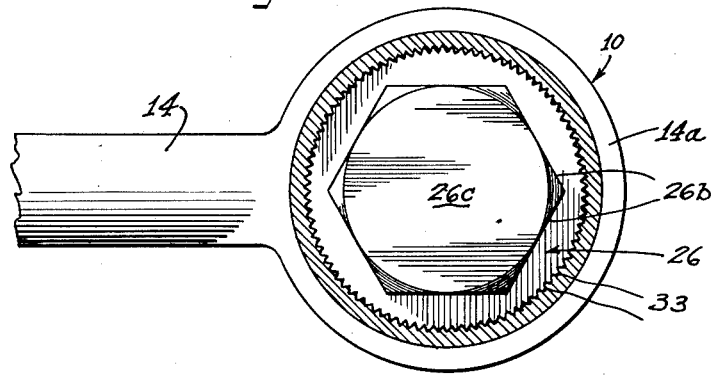
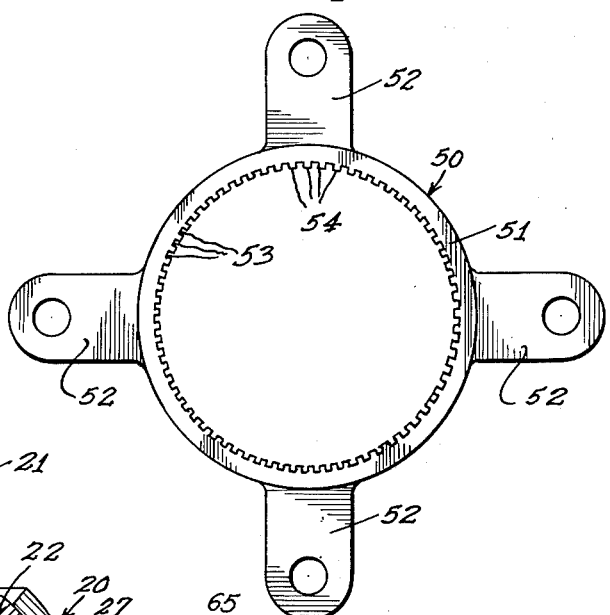
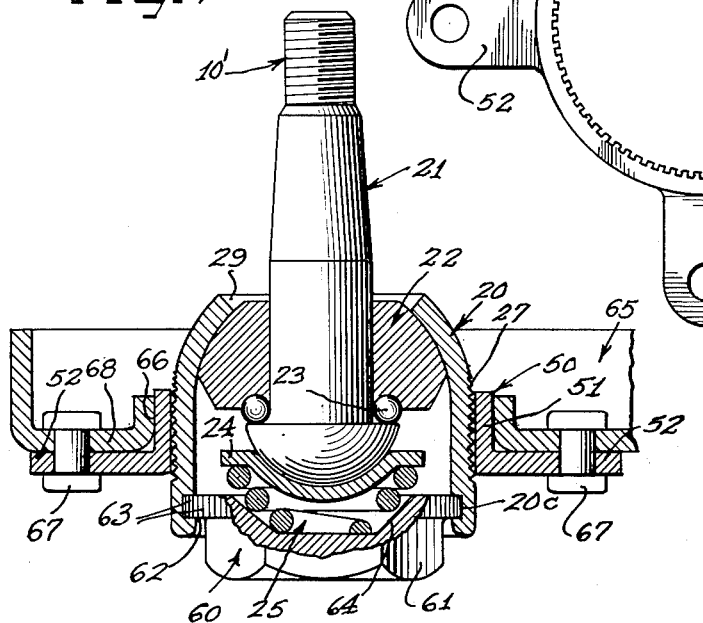
Inventor
EDISON HEDGES

3,059,950
BALL JOINT SOCKET ASSEMBLIES FOR STEERING LINKAGE AND THE LIKE
Edison Hedges, Margate, N.J., assignor to Thompson Ramo Wooldridge Inc., a corporation of Ohio
Filed Apr. 11, 1955, Ser. No. 500,551
3 Claims. (Cl. 287—87)

This invention relates to socket assemblies adapted to be threaded into linkage mountings or the like to form universal joint connections. More specifically, this invention deals with self-tapping ball and socket cartridges having wrench engageable heads whereby the units can be driven into the eye portions of forgings or stampings to articulately connect with other forgings or stampings.

The socket assemblies of this invention will hereinafter be specifically described as embodied in self-tapping ball joint cartridges for steering linkages, wishbones, wheel suspensions, or the like automotive parts, but it should be understood that the units of this invention are generally adaptable for joining two or more parts in articulate relation.

The ball joint cartridges of this invention include a stud having a tapered shank adapted to be wedge fitted into an eye, a ball head on the shank tiltably mounted in a stamped socket, a wrench head on the socket, and self-tapping threads around the socket for locking in a second eye member whereby the socket assembly links two eye members together while accommodating limited universal movement therebetween. The stud preferably has a cylindrical shank portion immediately adjacent the tapered portion and a fragmental spherical head at the end of the cylindrical portion with a shoulder between the head and cylindrical portion. A fragmental ball member has an axial bore receiving the cylindrical stud shank, a spherical bearing wall riding on a spherical bearing portion of the stamped socket and an end face opposing the shoulder. Anti-friction elements are disposed between the shoulder and the end face of the ball member to facilitate rotation of the stud in the ball member. A spring loaded retainer receives the round head of the stud in rockable relation. The wrench head portion of the socket is a closure disk spun into the open end of the socket and is either stamped or formed from solid bar stock. To prevent relative rotation between the wrench head closure disk and the socket, the periphery of the closure disk or a receiving recess of the socket member, or both, are serrated.

The stamped self-tapping socket or casing is heavy enough to be driven into an unthreaded eye of a heavy forging or stamping and the socket casing threads are preferably tapered to form a wedge fit in the eye. The assemblies or cartridges can be replaced when worn and this invention thereby reduces the cost of ball and socket connections by eliminating the replacement of heavy housing and link members whenever the constituents of the ball joint need replacement. In accordance with the present invention, the linkage members or housing parts will merely be equipped with a new cartridge assembly.

It is then an object of this invention to provide a joint assembly or cartridge adapted to be replaceably mounted in a housing.

A further object of this invention is to provide a ball and socket cartridge unit with a self-tapping tapered thread and a wrench head whereby the unit can be easily driven into the eye portion of a forging, stamping, or the like.

A still further object of this invention is to provide a replaceable ball and socket assembly adapted to be driven into a housing in fixed relation therewith.

A still further object of this invention is to provide a cartridge type ball joint having a socket head adapted to be engaged by a wrench for driving the cartridge into a housing.

A still further object of this invention is to provide a ball and socket joint with an externally threaded stamped metal socket and a wrench head closure disk affixed to the socket in non-rotatable relation.

A specific object of the invention is to provide a self-tapping ball joint cartridge unit with a non-rotatable wrench head on one end thereof.

A still further object of this invention is to provide a ball and socket joint with a closure disk having a wrench head thereon.

Another object of this invention is to provide an automotive steering linkage wherein the parts are connected by ball stud and socket cartridges having the socket driven into one part and the stud wedge fitted in a cooperating part.

A still further object of the invention is to provide a ball and socket assembly with a housing having an internally broached socket receiving portion in threaded engagement therewith.

Other and further objects of this invention will be apparent to those skilled in this art from the following detailed description of the annexed sheets of drawings which, by way of preferred example only, illustrate several embodiments of this invention.

On the drawings:

FIGURE 1 is an exploded, somewhat diagrammatic, front elevational view of an automotive steering linkage according to this invention.

FIGURE 2 is a plan view of an automotive wishbone and joint assembly according to this invention.

FIGURE 3 is an enlarged, exploded, vertical, cross-sectional view with parts in elevation, of a preferred form of a ball joint cartridge assembly according to this invention.

FIGURE 4 is an assembled view of the cartridge of FIGURE 3 illustrating the manner in which the unit is driven into a housing.

FIGURE 5 is a horizontal, cross-sectional view, with parts in bottom plan, taken along the line V—V of FIGURE 4.

FIGURE 6 is a bottom plan view of a stamped housing for receiving a ball joint cartridge unit of this invention.

FIGURE 7 is a cross-sectional view, with parts in elevation, of a modified ball and socket cartridge unit mounted in a stamped housing of FIGURE 6.

As shown on the drawings:

As shown in FIGURE 1, ball and socket cartridge units 10 of this invention, are utilized to form universal joint connections between the various links and parts of a steering linkage 11. The steering linkage 11 includes a pitman arm 12 driven by the conventional steering gear box (not shown), an idler arm 13 pivotally supported from the automobile frame on the side of the vehicle opposite the pitman arm, and a cross-rod 14 between the pitman arm and idler arm. The pitman arm 12 has a stud-receiving eye end 12a in a horizontal plane overlying the rod 14. The idler arm has a similar stud-receiving eye end 13a. The cross-rod 14 has socket receiving eye ends 14a underlying and aligned with the ends 12a and 13a. The cross-rod 14 also has stud-receiving eyes 14b in the intermediate portion thereof. Tie rods 15 have socket-receiving inner eye ends 15a underlying and aligned with the stud-receiving eyes 14b of the cross-rod 14. The outer ends of the tie rods 15 have stud-receiving eyes 15b.

Steering wheel knuckles 16 having steering arms 17 equipped with socket-receiving eye ends 17a, underlie the stud-receiving eyes 15b of the tie rods 15 in alignment with these eyes.

The ball joint cartridge units 10 of this invention, as shown in FIGURES 3 to 5, are composed of a heavy stamped metal casing or socket 20, a metal stud 21, a metal bearing ring or ball 22, a plurality of anti-friction bearings 23, a retainer 24, a spring 25, and a closure disk 26. The casing 20 has a generally cylindrical side wall 20a with an inturned portion 20b at one end thereof and a counterbore 20c in the other end thereof. The cylindrical wall 20a is provided with external tapered self-tapping threads 27 increasing in diameter from the inturned portion 20b to the counterbore 20c.

The inturned portion 20b provides a fragmental spherical internal bearing wall 28 adjacent a reduced diameter opening 29 through the top of the casing 20. The cylindrical wall 20a of the casing provides a cylindrical chamber 30 adjacent the bearing wall 28 and the counterbore 20c provides an internal radial shoulder 31 at the bottom of the chamber 30.

The stud 21 has a shank with a reduced diameter threaded end 21a, a tapered portion 21b diverging from the threaded end 21a, and a cylindrical portion 21c. The stud also has an enlarged head on the end thereof providing a rounded shoulder 21d at the base of the cylindrical portion 21c and a fragmental spherical bottom bearing wall 21e.

The bearing 22 has an axial bore 22a therethrough receiving the cylindrical stud shank portion 21c in free rotatable relation. A fragmental spherical outer bearing wall 22b on the bearing 22, mates with the bearing wall 28 of the casing in tiltable relation. This bearing wall 22b extends from a flat top 22c to a beveled side wall 22d which slopes inwardly to a flat bottom 22e. The flat bottom has a central recess 22f.

The anti-friction elements 23 preferably take the form of a ring of ball bearings riding on opposed races provided by the rounded shoulder 21d of the stud and the recess 22f in the bottom of the bearing.

The retainer 24 is a stamped metal or molded plastic disk of smaller diameter than the chamber 30 and has a flat peripheral margin 24a with a centrally depressed dimple 24b defining a fragmental spherical bearing wall 32 for the bearing wall 21e of the stud head.

The spring 25 has a large diameter end coil 25a surrounding the dimple 24b of the retainer and bottomed on the marginal flange 24a. The opposite end of the spring has a small diameter end coil 25b bottomed in the closure disk 26.

The closure disk 26 is a metal stamping with a flat peripheral flange 26a extending to a depressed central portion with a hexagonal side wall 26b and a flat bottom 26c. The periphery of the disk flange 26a has serrations 33 therearound. The depressed portion of the closure disk defines a well 34 receiving the spring 25 and the bottom wall 26c provides a bottom for the spring coil 25b. The retainer 24 is of larger diameter than the well 34 so that the retainer flange 24a is adapted to be bottomed on the flange 26a of the closure disk to limit axial shifting of the stud in the casing.

The flange 26a of the closure disk is bottomed against the shoulder 31 and the end of the casing projecting beyond this flange is spun under the flange to provide a retaining bead 35. The serrations 33 around the periphery of the closure disk flange bite into the wall of the counterbore 20c of the casing to lock the disk against rotation relative to the casing. The bead 35 coacts with the shoulder 31 to firmly clamp the closure disk flange in the counterbore.

The depressed central portion of the closure disk 26 extends beyond the end of the casing 20 so that the hexagonal side wall 26b is easily accessible to form a wrench head.

The stud 21 can rotate freely in the bearing 22 and the bearing 22 can universally tilt in the casing 20. The spring 25 urges the retainer 24 against the head of the stud and the shoulder of the stud head urges the ball bearings 23 against the bottom of the recess 22f in the bearing 22. The spring is thus effective to maintain the parts in bearing engagement with the bearing 22 on the bearing wall 28, the balls 23 on the opposed races provided by the recess 22f and the shoulder 21d and the retainer on the bearing wall 21e of the stud head. The opening 29 in the top of the casing 20 limits the tilting movement of the stud since the stud shank projects through this opening.

As shown in FIGURE 4, the tapered self-tapping threads 27 in the casing 20 are driven through the eye 14a of the cross-rod 14 to fixedly mount the casing in the eye end of the rod. The hexagonal head 26b of the closure disk 26 projects beneath the bottom of the rod 14 and, as explained above, beyond the casing 20 so that a wrench engaging the head can provide the driving force to cause threads to cut into the eye 14a. Of course, the unit 10 can be replaced by reverse rotation to unscrew the casing from the eye 14a and a new unit can be driven into the eye in wedge tight locked relation through the tapered threads. The tapered portion 21b of the stud shank 21 is wedge fit into a tapered stud-receiving eye 12a. A nut 36 threaded on the threaded end 21a of the stud shank, thrusts against the tapered eye on the stud.

Thus, the stud will transmit lateral shifting movements of the pitman arm 12 to the cross-rod 14 while accommodating relative tilting and rotating movements of the pitman arm and cross-rod. This same transmission of force and accommodation of relative displacement of the linked-together parts occurs in each connection made by the units 10 of this invention.

As indicated in FIGURE 1, each casing 20 of a cartridge unit 10, has its thread 27 driven into a socket-receiving eye 14a, 15a, or 17a. The stud 21 of each unit 10 has a tapered shank portion 21b wedge fitted in a stud-receiving eye 12a, 13a, 14b and 15b. The threaded ends 21a of the studs 21 are adapted to receive nuts, such as 36, thrusting against the stud-receiving eyes to wedge lock the tapered stud portions 21b in the eyes.

The linkage of FIGURE 1 transmits steering action from the pitman arm to the wheel knuckles 16. When the pitman arm is swung about its pivot, the eye end 12a thereof will laterally shift the cross-rod 14 and the idler arm will accommodate this shifting. The tie rods connected to the intermediate eye portions 14b, of the cross-rod 14, will be shifted with the cross-rod to drive the steering arms which effect rotation of the knuckles about their pivot supports.

As shown in FIGURE 2, the unit 10 of this invention is conveniently mounted in a wishbone assembly 40 to form a universal joint connection for the wishbone. The wishbone 40 is composed of a pair of arms 41 and 42 converging to flat mating pad portions 41a and 42a which are secured together in face-to-face relation by mounting bolts 43 extending therethrough. The divergent ends of the arms have mounting bosses or eyes 41b and 42b.

The arm 41 projects beyond the pad portion 41a thereof and has an eye end 41c receiving the socket or casing 20 of a cartridge unit 10 of this invention. The cartridge units 10 of this invention thus make possible an inexpensive forged wishbone construction composed of two forged arms one of which has the eye to receive the casing of the unit and the other of which is bolted to the eye-equipped arm.

In FIGURE 6, a stamped housing 50 is provided for receiving a unit 10 of this invention. This housing 50 has an open ended cylindrical portion 51 with a plurality of mounting arms or legs 52 radiating from the bottom thereof. The interior of the cylindrical portion 51 is axially broached at 53 to provide upstanding ribs or teeth 54 around the interior thereof.

As shown in FIGURE 7, a modified unit 10′ of this invention is mounted in the stamped housing 50. In the unit 10', parts identical with parts described in connection with the unit 10, have been marked with the same reference numerals and have the same function.

In place of the stamped closure disk 26 of the unit 10, the unit 10' is equipped with a heavy solid closure plug 60. This plug can be machined or forged from hexagonal bar stock and has a solid hexagonal head 61 with a radial circular flange 62 at one end thereof. The flange 62 is serrated at 63 around its periphery and is pressed into the counterbore 20c of the casing in the same manner as the closure disk 26. The plug 60 preferably has a recess 64 in the central portion of its top face for receiving the spring 25.

The plug 60 can accept higher wrench torque than the stamped closure 26.

The self-tapping threads 27 on the casing 20 are driven into the broached teeth 54 of the housing 50 and the broaching 53 facilitates the tapping operation by the threads 27. The housing 50 can be mounted on the control arm 65 for a ball joint wheel suspension and the stud 21 can be connected to the wheel spindle arm (not shown) of the suspension. As shown in FIGURE 7, the portion 51 of the housing 50 fits in the eye end 66 of the arm 65 and fasteners 67 secure the legs 52 to the mounting pad 68 of the arm. If desired, the housing 50 can be an integral part of the wheel suspension control arm. Thus, this arm 65 could have a forged or stamped eye end portion 66 shaped to directly receive the casing 20 and the eye could have a plain, broached or threaded inner peripheral wall. Obviously, the housing 50 can be used in any environment where a joint connection is needed.

As shown in FIGURE 7, the plug 60 projects from the bottom of the casing 20 and is positioned beyond the housing 50 so that the hexagonal head 61 thereof is readily accessible for manipulation by a wrench.

The wrench head-equipped closure plugs for the units of this invention must be locked in non-rotatable relation with the casings and while press fit serrated connections have been illustrated, it should be understood that any suitable locking connection can be used including, for example, seating of non-circular plug flanges in mating counterbores, use of serrations in the counterbores instead of on the plug flanges, or use of serration or other roughened gripping surfaces on both the plug and the counterbore wall.

While self-tapping threads 27 are preferred, the casing 20 can be provided with tapered pipe threads or with standard threads. These threads can mate with threads in the eye end 14a or in the housing 50.

From the above description is should, therefore, be understood that this invention provides a ball and socket assembly or universal joint cartridge unit adapted to be driven into forgings, stampings, or the like housings. The units of this invention avoid the heretofore necessary expensive forged socket housings equipped with integral mounting stems or the like. The stamped sockets of this invention coact with the inexpensively formed receiving eyes to provide a reinforced assembly which will be capable of resisting all loads to which the joint will be subject in operation.

It will be understood that variations and modifications may be effected without departing from the scope of the novel concepts of this invention.

I claim as my invention:

1. A ball and socket cartridge unit for mounting in an eye which comprises a casing composed of a metal stamping having a cylindrical side wall with a fragmental spherical end portion converging to a reduced diameter opening and providing an internal bearing wall, a counterbore in the end of said casing remote from said fragmental spherical end portion, said counterbore providing a recess in the casing bottomed by a shoulder adjacent said remote end of the casing, a bearing member tiltably mounted on the internal bearing wall of the casing, a headed stud having a shank extending through the bearing member in rotatable relation and projecting freely through the reduced diameter opening together with a head underlying the bearing member, means for connecting the projecting portion of the shank to a link member, a closure plug for said casing seated in said counterbore against said shoulder, means locking said closure plug to said casing in non-rotatable relation therewith, spring means bottomed on said plug acting on said stud head to maintain the stud, the bearing member, and the internal bearing wall of the casing in bearing relation, said closure plug having an external peripheral wrench head engaging portion, threads around the cylindrical casing increasing in diameter from the fragmental spherical end portion to the counterbored end portion and adapted to be driven into an eye housing having an eye diameter less than the counterbored end of the casing, said spherical end portion of the casing adapted to fit freely through said eye housing and said wrench head adapted to transmit torque to the casing, said link member attachable to the stud being too large to fit through the eye housing receiving the casing whereby said unit cannot drop out of said eye housing.

2. A self driving ball and socket cartridge unit for connecting in relatively tilting and rotating relation a first eye member to a second eye member which is too large to fit through the first eye member comprising a casing composed of an open ended metal stamping having a generally cylindrical side wall with a self-tapping thread therearound, a separate hollow cup-shaped wrench head non-rotatably locked in one open end of the casing and projecting beyond the casing to close the said one open end and to provide readily accessible torque transmitting peripheral surfaces engageable with a wrench, a reduced diameter portion on the other end of the casing converging to an opening in said other end of the casing, a stud assembly rotatable and tiltable in the casing with a shank projecting freely through said opening, a spring bottomed in the hollow interior of said wrench head acting on said stud assembly to urge the assembly into bearing engagement with the converging portion of the casing, said self-tapping thread on said cylindrical side wall of the casing increasing in diameter toward the wrench head end of the casing, said second member sized for wedge fit engagement with the tapered thread to prevent the casing from being pulled through the eye, said shank having a tapered portion sized for fitting said first eye, and a threaded end for receiving a nut to be bottomed on said first eye to wedge lock the shank to the first eye whereby the wedge thread fit of the casing thread and the second eye prevent the unit from being pulled through the second eye and the wedge fit of the tapered shank portion and the first eye prevent the unit from dropping out of the second eye.

3. A joint assembly which comprises a member having an open ended eye portion, a ball joint cartridge unit having a casing composed of a metal stamping with a large diameter open end at one end thereof and a small diameter open end at the other end thereof, a ball stud having a shank projecting freely through said small diameter open end of the casing and a head portion tiltably mounted in the casing, a cup-shaped hollow head having an outturned flange around the open end thereof with a serrated periphery locked in said large diameter open end of the casing in non-rotatable relation therein and closing said large diameter end of the casing, means bottomed and centered in the hollow head acting on the head portion of the ball stud to maintain the head portion of the ball stud in bearing relation with the casing, said hollow head having an external peripheral polygonal portion projecting beyond the casing to provide a wrench receiving head for transmitting torque to the casing, said casing having an externally threaded cylindrical side wall threaded into said eye portion along part of its axial length, and means for attaching the projecting stud portion of the ball stud to a member too large to fit through the eye portion.

References Cited in the file of this patent
UNITED STATES PATENTS

| | | |
|---|---|---|
| 1,796,142 | Crawford | Mar. 10, 1931 |
| 2,253,436 | Leighton | Aug. 19, 1941 |
| 2,323,624 | Scholl | July 6, 1943 |
| 2,424,455 | Graham et al. | July 22, 1947 |
| 2,428,676 | Moore | Oct. 7, 1947 |
| 2,464,982 | Leighton | Mar. 26, 1949 |
| 2,977,131 | Moskovitz et al. | Mar. 28, 1961 |

FOREIGN PATENTS

| | | |
|---|---|---|
| 694,136 | Great Britain | July 15, 1953 |